US006995548B2

United States Patent
(12) United States Patent
Walters et al.

(10) Patent No.: US 6,995,548 B2
(45) Date of Patent: Feb. 7, 2006

(54) ASYMMETRICAL MULTIPHASE DC-TO-DC POWER CONVERTER

(75) Inventors: Michael M. Walters, Apex, NC (US); Shea L. Petricek, Round Rock, TX (US)

(73) Assignee: Intersil Americas Inc., Milpitas, CA (US)

(*) Notice: Subject to any disclaimer, the term of this patent is extended or adjusted under 35 U.S.C. 154(b) by 210 days.

(21) Appl. No.: 10/696,138

(22) Filed: Oct. 29, 2003

(65) Prior Publication Data

US 2005/0093525 A1 May 5, 2005

(51) Int. Cl.
*G05F 1/59* (2006.01)

(52) U.S. Cl. ........................................ 323/272; 363/65

(58) Field of Classification Search ................ 323/268, 323/272; 363/65

See application file for complete search history.

(56) References Cited

U.S. PATENT DOCUMENTS 5,309,344 A * 5/1994 Smith .......................... 363/20
6,134,129 A * 10/2000 Keller ......................... 363/65
6,381,155 B1 * 4/2002 Kadatsky et al. ............. 363/65
6,433,522 B1 * 8/2002 Siri ............................ 323/272
6,465,993 B1 * 10/2002 Clarkin et al. .............. 323/272
6,545,450 B1 * 4/2003 Ledenev et al. ............ 323/272
6,577,515 B2 * 6/2003 Kates .......................... 363/65
6,605,931 B2 * 8/2003 Brooks ........................ 323/272
6,636,023 B1 * 10/2003 Amin ......................... 323/268
6,696,882 B1 * 2/2004 Markowski et al. ........ 327/531
6,801,026 B2 * 10/2004 Schrom et al. ............. 323/272
6,806,689 B2 * 10/2004 Schuellein et al. ......... 323/272

* cited by examiner

*Primary Examiner*—Jeffrey Sterrett
(74) *Attorney, Agent, or Firm*—Allen, Dyer, Doppelt, Milbrath & Gilchrist, P.A.

(57) ABSTRACT

A multiphase DC-DC converter architecture, in which respectively different channels have different operational performance parameters. These different parameters are selected so as to enable the converter to achieve an extended range of high efficiency. The converter contains a combination of one or more fast response time-based converter channels, and one or more highly efficient converter channels in respectively different phases thereof and combines the outputs of all the channels. The efficiency of the asymmetric multiphase converter is higher at light loads (up to approximately 12 amps), enabling it to offer longer battery life in applications that spend most of their operating time in the leakage mode, as noted above.

4 Claims, 3 Drawing Sheets

VREF
20
10-3
FAST CHANNEL
DRIVE AND CONTROL
12-3
VIN
30-3
31-3
Lo
33-3
50
CLOCK
FAST CHANNEL
DRIVE AND CONTROL
VIN
31-2
FAST POWER CHANNELS
35
Vo
40
LOAD
-Lo
33-2
Co
10-2
12-2
30-2
÷N
55
EFFICIENT CHANNEL
DRIVE AND CONTROL
VIN
33-1
Lo
31-1
10-1
12-1
30-1
EFFICIENT POWER CHANNEL

ASYMMETRICAL MULTIPHASE DC-TO-DC POWER CONVERTER

FIELD OF THE INVENTION

The present invention relates to DC power supply systems and subsystems thereof, and is particularly directed to a new and improved multiphase DC-DC converter architecture, in which respectively different channels thereof have different operational performance parameters, so as to enable the converter to achieve an extended range of high efficiency.

BACKGROUND OF THE INVENTION

Selecting the value of an inductor in a DC-DC converter involves a trade-off between the converter's response time and its efficiency. Employing a small inductor enables the converter to deliver current more rapidly than a converter having a large valued inductor. A small inductance value usually requires a relatively high switching frequency in order to help limit the peak-to-peak ripple current. On the other hand, the efficiency of the converter decreases as the inductor value decreases, due to an increase in RMS current and switching losses.

SUMMARY OF THE INVENTION

In accordance with the present invention, this tradeoff between performance (response time or speed) and efficiency (output power/input power) is optimized by means of a multiphase DC-DC converter architecture, in which respectively different channels have different operational performance parameters. These different parameters are selected so as to enable the converter to achieve an extended range of high efficiency. In particular, the invention employs a combination of one or more fast response time-based converter channels, and one or more highly efficient converter channels and combines the outputs of all the channels.

As will be described, the resulting asymmetrical multiphase DC-DC converter in accordance with the present invention may be configured to emphasize (utilize) the high efficiency channel for light load conditions (e.g., up to on the order of 12–15 amps), wherein the high efficiency channel is used to provide 100% of leakage current. This allows the converter to offer longer battery life in notebook power supply applications, and reduced thermal loading (heat) in desktop computer applications, that spend a large portion of their operating time in leakage current mode. With the high efficiency channel being used to supply 100% of the leakage current, the remaining fast response time-based channels are employed to handle high load current conditions. In a two fast response time channel embodiment, each of these fast channels is controlled so as to handle half of the high load current demand.

DETAILED DESCRIPTION

Figure 1:
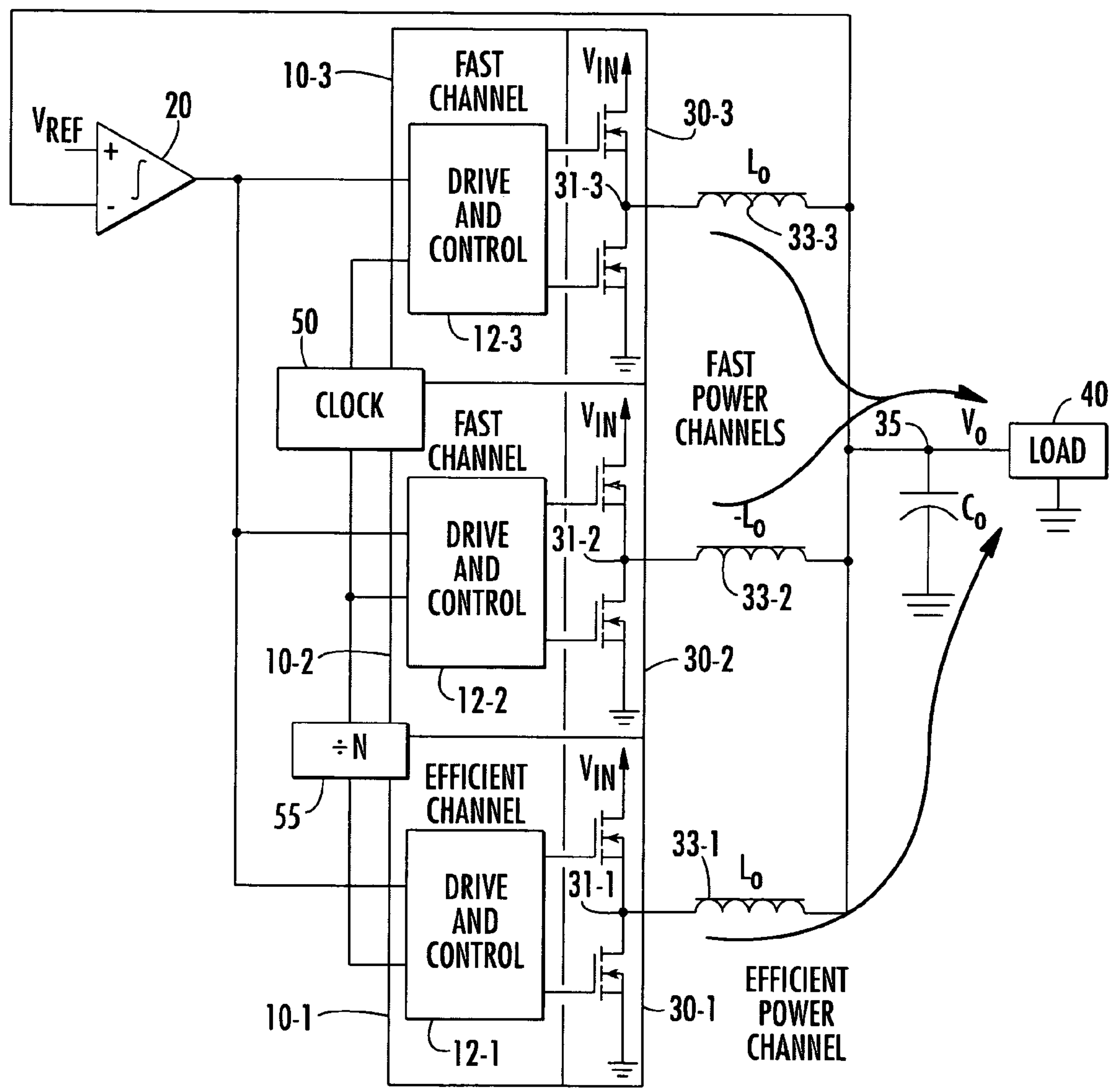
FIG. 1 diagrammatically illustrates an embodiment of the asymmetrical multiphase DC converter in accordance with the present invention.

Before describing in detail the new and improved asymmetrical multiphase DC converter architecture of the present invention, it should be observed that the invention resides primarily in modular arrangements of conventional DC power supply circuits and components, and control circuitry therefor that controls the operations of such circuits and components. In a practical implementation these modular arrangements may be readily configured as field programmable gate array (FPGA)-implementation and application specific integrated circuit (ASIC) chip sets.

Consequently, the configuration of such arrangements of circuits and components and the manner in which they are interfaced with equipment powered thereby (such as a microprocessor) have, for the most part, been illustrated in the drawings by readily understandable block diagrams, and associated timing diagrams therefor, which show only those specific details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

Attention is now directed to FIG. 1, which diagrammatically illustrates an embodiment of the asymmetrical multiphase DC converter in accordance with the present invention, as comprising a plurality of pulse width modulator-based converter channels, three of which are shown at 10-1, 10-2 and 10-3, for purposes of illustrating a practical, but non-limiting example. The number three is based upon a pragmatic use of the invention to accommodate a load current demand of 60 amps, with each channel bearing one-third of the load. Of the three channels, channel 10-1 is a highly efficient channel whose functionality is to supply leakage current (which may be on the order of up to 20 amps) to the load. The remaining 40 amp demand is divided in half and assigned to each of the two fast response channels 10-2 and 10-3.

For each of the respective channels there is a respective drive and control unit 12-1, 12-2 and 12-3, which monitors the output of an integrating error amplifier 20, and controllably supplies drive signals to associated output switching upper and lower MOSFET pairs 30-1, 30-2 and 30-3. The common or phase node 31-1 of MOSFET pair 30-1 is coupled through an inductor 33-1 to a power combining output node 35, to which an output capacitor Co and a LOAD 40 are coupled. The common or phase node 31-2 of MOSFET pair 30-2 is coupled through an inductor 33-2 to power combining output node 35, and the common or phase node 31-3 of MOSFET pair 30-3 is coupled through an inductor 33-3 to power combining output node 35.

As described briefly above inductor 33-1 of the high efficiency channel may be larger than the inductors 33-2 and 33-3 of the fast response time channels, as small valued inductors enable the fast response time channels 10-2 and 10-3 to deliver current more rapidly than the highly efficient channel 10-1, which employs a relatively large valued inductor. Associated with the use of relatively small valued inductances for each of the fast channels is a relatively high frequency clock 50, the output of which is reduced for the high efficiency channel 10-1 by means of a divider 55.

Figure 2:
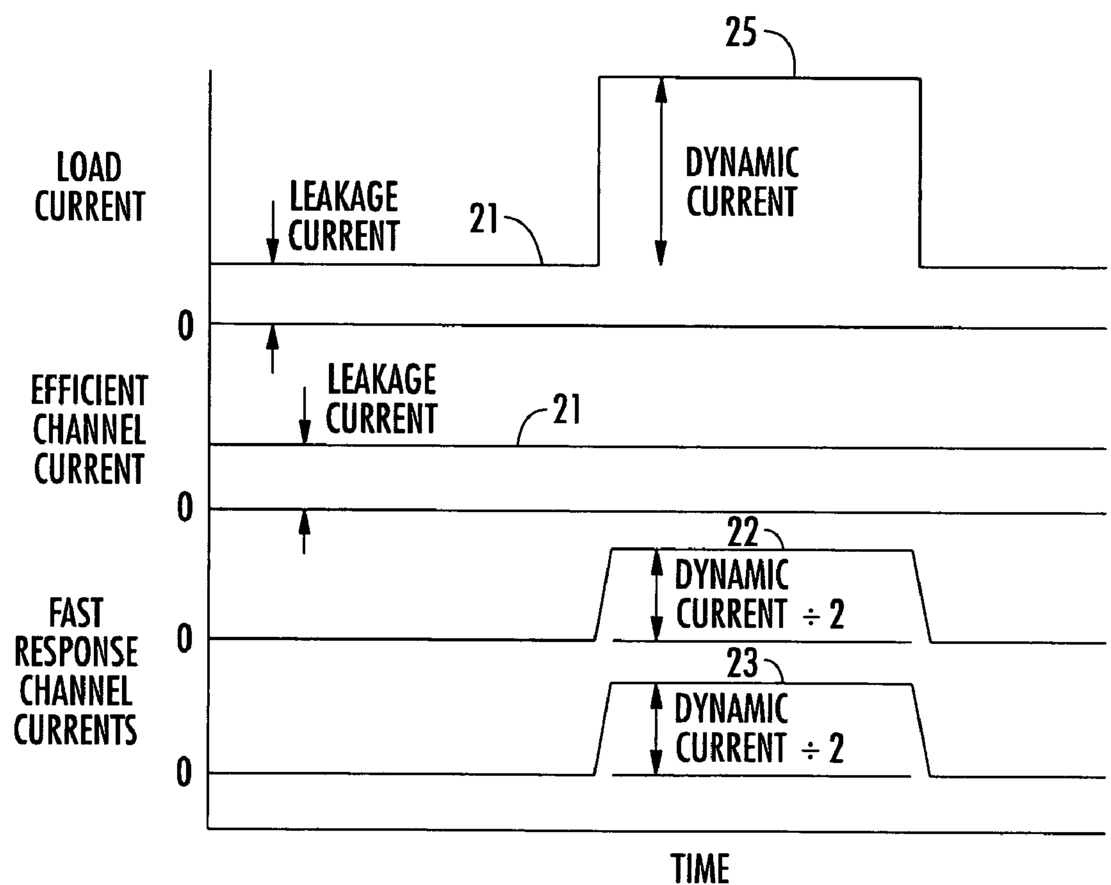
FIG. 2 is a set of transient response timing diagrams associated with the operation of the asymmetrical DC converter architecture of FIG. 1.

Operation of the asymmetrical architecture of FIG. 1 may be understood by reference to the transient load behavior for each of the channels depicted in FIG. 2. As pointed out above, the high efficiency channel 10-1 is utilized for light load conditions (e.g., up to on the order of 20 amps), wherein it provides 100% of the leakage current, as shown at 21. This allows the converter to offer longer battery life in notebook power supply applications, that spend a large portion of their operating time in leakage current mode.

With the high efficiency channel being used to supply 100% of the leakage current, each of the two fast response time-based channels 10-2 and 10-3 is controlled so as to handle one-half of the high load current demand. This is shown at 22 and 23, where the dynamic increase in current demand from the leakage value 21 to a full load value 25 is born equally by the two high efficiency channels 10-2 and 10-3. Thus, the transient load traces 21, 22 and 23 show the asymmetric nature of the load current supplying operation of the invention, the produce the load current composite at the power combining output node 35, shown in the top trace of FIG. 2.

Figure 3:
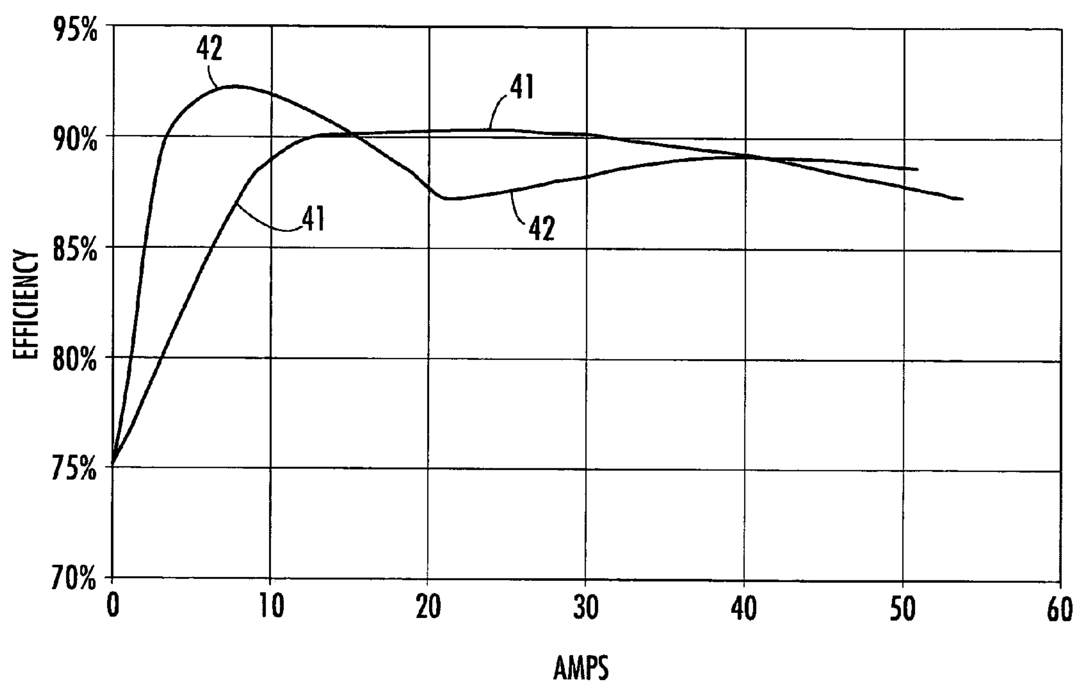
FIG. 3 is a graphical comparison of the projected efficiency for a conventional multiphase comparator, wherein all channels are identically configured and equal load sharing, and the projected efficiency for the asymmetric multiphase embodiment of the present invention.

FIG. 3 is a graphical comparison of the projected efficiency 41 for a conventional multiphase converter, wherein all channels are identically configured and equal load sharing, and the projected efficiency 42 for the asymmetric multiphase embodiment of the present invention. The conventional efficiency curve 41 is derived from laboratory measurements of a single fast channel, while the asymmetrical multiphase efficiency curve 42 is a composite using a single slower high efficiency channel and two fast response time power channels. For current values less than 20 amps, the non-load loss of the fast power channels was added to the power losses of the high efficiency channels; above 20 amps, the load loss of the high efficiency channel was added to the power losses of the two fast channels. From FIG. 3, it can be seen that the efficiency of the asymmetric multiphase converter is higher at light loads (up to approximately 12 amps). This enables it to offer longer battery life in applications that spend most of their operating time in the leakage mode, as noted above.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A multiphase DC-DC power converter for supplying power to a load comprising:

a plurality of DC-DC converter channels, outputs of which are combined at an output node to provide a composite DC current to said load, said plurality of DC-DC converter channels including a first, high efficiency channel having a first, relatively high power conversion efficiency and a first response time, and one or more second fast response time channels, each having a second power conversion efficiency less than said first, relatively high power conversion efficiency, and a second response time that is faster than said first response time; and a single control loop, which monitors said output node and simultaneously and continuously enables each of said high efficiency channel and said one more fast response time channels, so as to cause said high efficiency channel to supply one-hundred percent of leakage current for a light load current condition and, in response to a dynamic increase in current demand from said leakage value to a full load current value, to cause said one more fast response time channels to respond by handling said full load current value, so as to realize a composite load current at said output node comprised of said leakage current and said full load current.

2. The multiphase DC-DC power converter according to claim 1, wherein said high efficiency channel has a larger output inductance than said one or more fast response time channels.

3. A method of supplying power to a load comprising the steps of:

(a) providing a multiphase DC-DC converter having a plurality of DC-DC converter channels, outputs of which are combined at an output node to provide a composite DC current to said load, said plurality of DC-DC converter channels including a first, high efficiency channel having a first, relatively high power conversion efficiency and a first response time, and one or more second fast response time channels, each having a second power conversion efficiency less than said first, relatively high power conversion efficiency, and a second response time that is faster than said first response time;

(b) simultaneously and continuously controlling each of said high efficiency channel and said one or more second fast response time channels by way of a single control loop, which monitors said output node and continuously enables each of said high efficiency channel and said one more fast response time channels, so as to cause said high efficiency channel to supply one-hundred percent of leakage current for a light load current condition and, in response to a dynamic increase in current demand from said leakage value to a full load current value, said one more fast response time channels responds by handling said full load current value, so as to realize a composite load current at said output node comprised of said leakage current and said full load current.

4. The method according to claim 3, wherein said high efficiency channel has a larger output inductance than said one or more fast response time channels.

* * * * *